United States Patent
Jeon et al.

(10) Patent No.: US 8,760,495 B2
(45) Date of Patent: Jun. 24, 2014

(54) METHOD AND APPARATUS FOR PROCESSING VIDEO SIGNAL

(75) Inventors: Yong Joon Jeon, Seoul (KR); Jae Won Sung, Seoul (KR); Byeong Moon Jeon, Seoul (KR); Jae Hyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 13/129,822

(22) PCT Filed: Nov. 18, 2009

(86) PCT No.: PCT/KR2009/006789
§ 371 (c)(1),
(2), (4) Date: May 18, 2011

(87) PCT Pub. No.: WO2010/058955
PCT Pub. Date: May 27, 2010

(65) Prior Publication Data
US 2011/0221861 A1  Sep. 15, 2011

Related U.S. Application Data

(60) Provisional application No. 61/115,906, filed on Nov. 18, 2008, provisional application No. 61/173,984, filed on Apr. 30, 2009, provisional application No. 61/221,101, filed on Jun. 29, 2009, provisional application No. 61/228,609, filed on Jul. 26, 2009.

(51) Int. Cl.
| | |
|---|---|
| *H04N 13/00* | (2006.01) |
| *H04N 13/04* | (2006.01) |
| *H04N 7/12* | (2006.01) |
| *H04N 11/02* | (2006.01) |
| *H04N 11/04* | (2006.01) |

(52) U.S. Cl.
USPC ........... 348/42; 348/153; 348/51; 375/240.25

(58) Field of Classification Search
None
See application file for complete search history.

(56) References Cited

U.S. PATENT DOCUMENTS

2003/0156188 A1* 8/2003 Abrams, Jr. ................. 348/51
2004/0100464 A1   5/2004 Oh et al.
(Continued)

FOREIGN PATENT DOCUMENTS

KR  10-20070098429 A  10/2007
WO  WO 2006/041261 A1  4/2006
(Continued)

OTHER PUBLICATIONS

Supplemental European Search Report dated Sep. 24, 2012 for Application No. 09827720, 9 pages.
(Continued)

*Primary Examiner* — Joseph Ustaris
*Assistant Examiner* — Ellyar Y Barazesh
(74) *Attorney, Agent, or Firm* — Fish & Richardson P.C.

(57) ABSTRACT

In a method for processing video signals acquired from multiple cameras, the present invention provides a method for processing video signals including receiving a multiview video coded bit stream including color pictures and depth pictures, wherein the depth picture indicates a group of digitalized information on a distance between a base camera and an object; acquiring data type identification information from the multiview video coded bit stream, wherein the data type identification information indicates whether or not depth-coded data are included in the multiview video coded bit stream; acquiring reference information between views of the depth picture based upon the data type identification information, wherein the reference information between views of the depth picture includes a number of depth-view reference pictures, and a view identification number of the depth-view reference picture; acquiring an estimation value of the depth picture by using the reference information between views of the depth picture; recovering the depth picture by using the estimation value of the depth picture; and acquiring a 3-dimensional image by using the recovered depth picture.

8 Claims, 11 Drawing Sheets

(56) References Cited

U.S. PATENT DOCUMENTS

| | | | |
|---|---|---|---|
| 2005/0117019 A1* | 6/2005 | Lamboray et al. | 348/159 |
| 2005/0280657 A1* | 12/2005 | Hori et al. | 345/619 |
| 2007/0109409 A1* | 5/2007 | Yea et al. | 348/153 |
| 2007/0177672 A1* | 8/2007 | Yang | 375/240.25 |
| 2009/0087111 A1* | 4/2009 | Noda et al. | 382/238 |
| 2010/0074334 A1 | 3/2010 | Jeon et al. | |

FOREIGN PATENT DOCUMENTS

| | | |
|---|---|---|
| WO | WO 2007047736 A2 * | 4/2007 |
| WO | WO 2008/133455 A1 | 11/2008 |

OTHER PUBLICATIONS

Ivana Radulovic et al.: "3DTV Exploration Experiments on Pantomime sequence", 86. MPEG Meeting; Oct. 13, 2008-Oct. 17, 2008; Busan; (Motion Picture Expert Group or ISO/IEC JTC1/SC29/WG11),, No. M15859, Oct. 9, 2008, XP-030044456 (section 3: see example configuartion files enumerating the different data types in the VSRS software).

Anthony Vetro: "MVC PROFILE/Level Definitions for Stereo", 28. JVT Meeting; 85. MPEG Meeting; Jul. 20, 2008-Jul. 25, 2008; Hannover, ; (Joint Video Team of ISO/IEC JTC1/SC29/WG11 and ITU-T SG.16),, No. JVT-AB037, Jul. 20, 2008, XP-030007423, ISSN:0000-0090 (p. 3, section on multiview video coding).

Fehn C.: "Depth-image-based rendering (DIBR), compression, and transmission for a new approach on 3D-TV", Proceedings of SPIE, SPIE, US, vol. 5291, May 31, 2004, pp. 93-104, XP-002444222, ISSN: 0277-786X, DOI:10.1117/12.524762 (section 3: depth-image based rendering).

International Search Report dated Jul. 1, 2010 for Application No. PCT/KR2009/006789, with English Translation, 4 pages.

* cited by examiner

FIG. 6

| S610 | nal_unit_header_mvc_extension( ) { |
|------|-------------------------------------|
|      | ... |
| S620 | depth_flag |
|      | } |

FIG. 7

| S710 | nal_unit_header_mvc_extension( ) { |
|------|-------------------------------------|
|      | ... |
| S720 | aux_idc |
| S730 | reserved_zero_6bits |
|      | } |

FIG. 8

| S810 | subset_seq_parameter_set_rbsp() { |
| | seq_parameter_set_data(?) |
| | if( profile_idc == 83 \|\| profile_idc == 86 ) { |
| | ... |
| S820 | } else if( profile_idc == 118 \|\| profile_idc ==3DV_PROFILE ) { |
| | bit_equal_to_one /* equal to?1 */ |
| S830 | seq_parameter_set_mvc_extension() |
| | mvc_vui_parameters_present_flag |
| S840 | if( mvc_vui_parameters_present_flag == 1 ) |
| | mvc_vui_parameters_extension() |
| S850 | if( profile_idc == 3DV_PROFILE ) { |
| S860 | seq_parameter_set_3dv_extension( ) |
| | ... |
| | } |
| | } |
| | } |

FIG. 9

| S910 | subset_seq_parameter_set_rbsp() { |
|---|---|
|  | seq_parameter_set_data() |
|  | if( profile_idc == 83 \|\| profile_idc == 86 ) { |
|  | ... |
| S920 | } else if( profile_idc == 118 ) { |
|  | ... |
| S930 | seq_parameter_set_mvc_extension() |
|  | ... |
| S940 | } else if( profile_idc == 3DV_PROFILE ) { |
| S950 | seq_parameter_set_3dv_extension( ) |
|  | ... |
|  | } |
|  | } |

FIG. 10

| | | |
|---|---|---|
| | S1010 | seq_parameter_set_3dv_extension() { |
| | S1020 | num_views_minus1 |
| | S1030 | skip_depth_dependency |
| A | | if( skip_depth_dependency == 0 ) { |
| | | for( i = 0; i <= num_views_minus1; i++ ) |
| | S1040 | depth_view_id[i] |
| | | for( i = 1; i <= num_views_minus1; i++ ) { |
| | S1051 | depth_num_anchor_refs_l0[i] |
| | | for( j = 0; j < num_anchor_refs_l0[i]; j++ ) |
| | S1052 | depth_anchor_ref_l0[i][j] |
| | S1053 | depth_num_anchor_refs_l1[i] |
| | | for( j = 0; j < num_anchor_refs_l1[i]; j++ ) |
| | S1054 | depth_anchor_ref_l1[i][j] |
| | | } |
| | | for( i = 1; i <= num_views_minus1; i++ ) { |
| | S1061 | depth_num_non_anchor_refs_l0[i] |
| | | for( j = 0; j < num_non_anchor_refs_l0[i]; j++ ) |
| | S1062 | depth_non_anchor_ref_l0[i][j] |
| | S1063 | depth_num_non_anchor_refs_l1[i] |
| | | for( j = 0; j < num_non_anchor_refs_l1[i]; j++ ) |
| | S1064 | depth_non_anchor_ref_l1[i][j] |
| | | } |
| | | } |
| B | S1070 | 3dv_acquisition_info() |

FIG. 11

| | | |
|---|---|---|
| | S1110 | seq_parameter_set_3dv_extension() { |
| | S1120 | num_views_minus1 |
| | S1130 | skip_depth_dependency |
| | | for( i = 0; i <= num_views_minus1; i++ ) |
| | S1140 | view_id[i] |
| | | for( i = 1; i <= num_views_minus1; i++ ) { |
| | S1151 | num_anchor_refs_l0[i] |
| | | for( j = 0; j < num_anchor_refs_l0[i]; j++ ) |
| | S1152 | anchor_ref_l0[i][j] |
| | S1153 | num_anchor_refs_l1[i] |
| | | for( j = 0; j < num_anchor_refs_l1[i]; j++ ) |
| C | S1154 | anchor_ref_l1[i][j] |
| | | } |
| | S1161 | for( i = 1; i <= num_views_minus1; i++ ) { |
| | | num_non_anchor_refs_l0[i] |
| | S1162 | for( j = 0; j < num_non_anchor_refs_l0[i]; j++ ) |
| | S1163 | non_anchor_ref_l0[i][j] |
| | | num_non_anchor_refs_l1[i] |
| | S1164 | for( j = 0; j < num_non_anchor_refs_l1[i]; j++ ) |
| | | } |
| A | S1170 | A (refer to FIG.10) |
| | | } |
| B | | 3dv_acquisition_info() |

FIG. 12

| | |
|---|---|
| S1210 | 3dv_acquisition_info(?payloadSize) { |
| | num_views_minus1 |
| S1211 | intrinsic_params_equal |
| S1212 | prec_focal_length |
| S1213 | prec_principal_point |
| S1214 | prec_skew_factor |
| | if( intrinsic_params_equal ) |
| | num_of_param_sets=1 |
| | else |
| | num_of_param_sets= num_views_minus1 + 1 |
| | for( i = 0; i < num_of_param_sets; i++ ) { |
| | /* intrinsic parameters */ |
| | } |
| S1221 | prec_rotation_param |
| S1222 | prec_translation_param |
| | for( i = 0; i <= num_views_minus1; i++ ) { |
| | /* rotation and translation parameters */ |
| | } |
| | prec_z_range |
| | To be continued...(right table) |
| | for( i = 0; i <= num_views_minus1; i++ ) { |
| S1230 | sign_z_near[ i ] |
| | exponent_z_near[ i ] |
| | mantissa_z_near[ i ] |
| S1240 | sign_z_far[ i ] |
| | exponent_z_far[ i ] |
| | mantissa_z_far[ i ] |
| S1251 | scale_x |
| S1252 | scale_y |
| S1261 | offset_x |
| S1262 | offset_y |
| S1263 | left_offset |
| S1264 | top_offset |
| S1265 | right_offset |
| S1266 | bottom_offset |
| | } |

METHOD AND APPARATUS FOR PROCESSING VIDEO SIGNAL

FIELD OF THE INVENTION

The present invention relates to a technology for processing video signals.

BACKGROUND ART

Compression encoding refers to a series of signal processing techniques that either transmit digitalized information through a communication line, or store digitalized information in a storage means in an adequate format. Targets of compression encoding may include audio (or sound), video (or image), text, and so on. Most particularly, a technique of performing compression encoding targeting video (or images) is referred to as video image compression. The general characteristic of a video image is that a video image carries spatial redundancy and temporal redundancy.

DETAILED DESCRIPTION OF THE INVENTION

Technical Objects

An object of the present invention is to enhance efficiency in processing audio signals.

Technical Solutions

The present invention provides a method and apparatus for efficiently realizing 3-dimensional display by using depth information and camera parameter information.

Also, by synthesizing 3-dimensional scenes taken at a virtual viewpoint (or perspective) using depth information and camera parameter information, the present invention provides a method and apparatus for generating a viewpoint of an image that is not transmitted.

Also, the present invention provides a method and apparatus for estimating (or predicting) movement information by using spatial and temporal relations between images configured of depth pictures.

Also, by defining header information for processing depth bit streams configured of depth pictures, the present invention provides an efficient method and apparatus for decoding video signals.

Also, by verifying a dependency relation between viewpoints (or perspectives) of a depth picture within a depth bit stream, the present invention provides a more efficient method and apparatus for decoding video signals.

Finally, by defining a syntax for codec compatibility, the present invention seeks to enhance compatibility between different types of codec.

Advantageous Effects

As described above, in realizing a 3-dimensional display using a stereoscopic 3D image or a multiview image taken from multiple directions by using a plurality of cameras, the present invention provides a method and device for efficiently processing depth information and camera parameters. Since a 3D image of a virtual view can be synthesized by using the depth information and the camera parameters, 3D contents may be created for the view of an image that has not yet been transmitted.

Also, by predicting movement information using temporal and spatial inter-relation of an image sequence (e.g., an image sequence configured of color pictures, depth pictures, or both color pictures and depth pictures), signal processing efficiency may be enhanced. Also, by predicting coding information of the current block using coding information of a picture, which has a high inter-relation with the current block, a more accurate prediction may be made. Also, since the transmitted amount of error values is reduced, an efficient coding process may be performed. Moreover, even if the movement information of the current block is not transmitted, movement information very similar to the movement information of the current block may be calculated. Thus, the recovery rate can be enhanced.

Furthermore, by defining header information for processing a depth bit stream configured of depth picture data, and by verifying the dependency between views within the depth bit stream, the coding efficiency may also be enhanced.

Finally, by defining a syntax for codec compatibility, the compatibility between different types of codec may be enhanced.

BRIEF DESCRIPTION OF THE DRAWINGS

FIG. 6 and FIG. 7 illustrate diverse exemplary information for identifying depth information, as embodiments applied in the present invention.

FIG. 8 and FIG. 9 illustrate diverse examples of identifying depth information, as embodiments applied in the present invention.

FIG. 10, FIG. 11, and FIG. 12 illustrate detailed information of data belonging to an expansion area of a depth-coded sequence parameter set, as embodiments applied in the present invention.

BEST MODE FOR CARRYING OUT THE INVENTION

Figure 1:
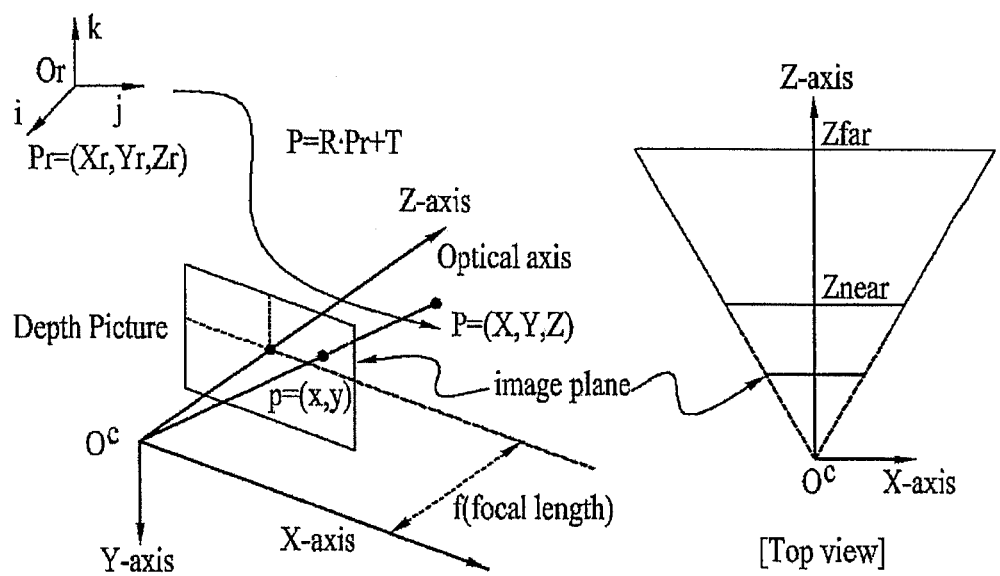
FIG. 1 illustrates a drawing shown to describe a depth concept, as an embodiment applied in the present invention.

In a method for processing video signals acquired from multiple cameras, the present invention provides a method for processing video signals including receiving a multiview video coded bit stream including color pictures and depth pictures, wherein the depth picture indicates a group of digitalized information on a distance between a base camera and an object; acquiring data type identification information from the multiview video coded bit stream, wherein the data type identification information indicates whether or not depth-coded data are included in the multiview video coded bit stream; acquiring reference information between views of the depth picture based upon the data type identification information, wherein the reference information between views of the depth picture includes a number of depth-view reference pictures, and a view identification number of the depth-view reference picture; acquiring an estimation value of the depth picture by using the reference information between views of the depth picture; recovering the depth picture by using the estimation value of the depth picture; and acquiring a 3-dimensional image by using the recovered depth picture.

Also, the present invention further includes receiving identification mode information for identifying whether or not the multiview video coded bit stream includes a depth-coded bit stream, wherein, if the multiview video coded bit stream is determined to include the depth-coded bit stream based upon the identification mode information, reference information between views of the depth picture may be acquired.

Also, the identification mode information may be acquired from a sequence header area.

Also, the data type identification information may be acquired from an extension area of a depth-coded NAL unit.

Also, the present invention further includes acquiring reference information between views of the color picture, wherein, if the reference information between views of the depth picture is identical to the reference information between views of the color picture, the reference information between views of the depth picture may be derived to have a same value as the reference information between views of the color picture.

Also, the multiview video coded bit stream includes a base view and a non base view of both color pictures and depth pictures, wherein the base view may indicate a view that can be decoded independently from other views without using a prediction between views, and wherein the non base view may indicate a view other than the base view.

Also, in case of the base view, the color picture may be transmitted earlier than the depth picture, and, in case of the non base view, the depth picture may be transmitted earlier than the color picture.

Also, in a device for processing video signals acquired from multiple cameras, the present invention provides a device for processing video signals an entropy decoding unit configured to acquire data type identification information from a multiview video coded bit stream including color pictures and depth pictures, wherein the depth picture indicates a group of digitalized information on a distance between a base camera and an object, and wherein the data type identification information indicates whether or not depth-coded data are included in the multiview video coded bit stream; a depth picture estimator configured to acquire reference information between views of the depth picture based upon the data type identification information, and to acquire an estimation value of the depth picture by using the reference information between views of the depth picture, wherein the reference information between views of the depth picture includes a number of depth-view reference pictures and a view identification number of the depth-view reference picture; and a formatter unit configured to recover the depth picture by using the estimation value of the depth picture, and to acquire a 3-dimensional image by using the recovered depth picture.

Mode for Carrying Out the Invention

The technique of compression encoding video signal data considers the characteristics of spatial redundancy, temporal redundancy, scalable redundancy, and a redundancy existing between viewpoints. Among such characteristics, in coding a depth picture for realizing a 3-dimensional display using multiple perspective (or multiview) images, compression encoding may be performed while considering the characteristics of spatial redundancy and temporal redundancy. Such technique for compression encoding may be applied to an image sequence configured of depth pictures, as well as an image sequence configured of color pictures or an image sequence configured of both depth pictures and color pictures. Herein, the term depth may signify a difference in variation, which may occur due to a difference in viewpoints (or perspectives). And, a detailed description of the same will be given with reference to FIG. 1. Additionally, in the description of the present invention, the terms depth information, depth data, depth picture, depth sequence, depth coding, depth bit stream, depth map, and so on may be flexibly interpreted as depth-related information in accordance with the above-mentioned definition of the term depth. Furthermore, in the description of the present invention, the term coding may include the concepts of both coding and decoding and may also be flexibly interpreted in accordance with the technical scope and spirit of the present invention.

Herein, a bit sequence structure of a video signal is defined as a separated layer structure referred to as an NAL (Network Abstraction Layer), which is located between a VCL (Video Coding Layer), which processes moving image coding itself, and a lower-layer system, which transmits and stores coded information. An output of the coding process corresponds to VCL data and is mapped in NAL units prior to being transmitted or stored. Each NAL unit includes compressed video data or RBSP (Raw Byte Sequence Payload (data resulting from moving image compression)), which refers to data corresponding to header information.

The NAL unit is essentially configured of two portions, the two portions being an NAL header and RBSP. The NAL header includes flag information (nal_ref_idc) indicating whether or not a slice, which becomes an NAL unit reference picture, is included, and an identifier (nal_unit_type) indicating a type of the NAL unit. Compressed original (or initial) data are stored in the RBSP. And, in order to express an RBSP length as a multiple of 8 bits, an RBSP trailing bit is added to an end portion of the RBSP. Such NAL unit types may include IDR (Instantaneous Decoding Refresh) pictures, SPS (Sequence Parameter Set), PPS (Picture Parameter Set), SEI (Supplemental Enhancement Information), and so on.

Also, in the technology standard, in order to realize the target products with an adequate cost, the target products are limited to various profiles and levels. Herein, a decoder should meet with the limitations defined for the respective profile and level. As described above, the two concepts of profile and level are defined in order to indicate the function or parameter enabling the decoder to respond to up to a certain compression image range. A profile identifier (profile_idc) indicates the specific profile upon which the bit stream is based. Herein, a profile identifier refers to a flag indicating the profile upon which the bit stream is based. For example, in an H.264/AVC, when the profile identifier is 66, this indicates that the bit stream is based upon a base line profile. And, when the profile identifier is 77, this indicates that the bit stream is based upon a main profile. And, when the profile identifier is 88, this indicates that the bit stream is based upon an extended profile. The profile identifier may be included in a sequence parameter set.

Therefore, in order to treat (or process) an image sequence including depth pictures (hereinafter referred to as a depth sequence), it should be identified whether or not the inputted bit stream corresponds to a profile of a depth sequence. And, when the bit stream is identified to correspond to the profile of a depth sequence, a syntax is required to be added, so that at least one set of additional information associated with depth coding can be transmitted. Herein, the profile of a depth sequence may indicate a profile mode treating (or processing) depth pictures as an additional technique of the H.264/AVC, or the profile of a depth sequence may indicate a profile mode related to a multiview video, which includes depth pictures. Since depth coding corresponds to an additional technique for the conventional AVC technique, it would be more efficient to add a syntax as additional information for a case where the coding mode is the depth coding mode, rather than an unconditional syntax. For example, when a profile identifier of the AVC indicates the profile of a depth sequence, encoding efficiency may be enhanced by adding information on depth coding. A sequence parameter set refers to header information including information covering the coding of the overall sequence, such as profile, level, and so on. Since the entire com presses moving image, i.e., sequence shall always begin from the sequence header, the sequence parameter set best fitting the header information should reach the decoder earlier than the data. Eventually, the sequence parameter set RBSP performs the role of header information for the result data of moving image compression. When a bit stream is inputted, the profile identifier first identifies which one of the plurality of profiles the inputted bit stream is based upon. Accordingly, by adding a portion that determines whether or not the inputted bit stream relates to a profile of a depth sequence (e.g., "If (profile_idc==DEPTH_PROFILE)") to the syntax, it is determined whether or not the inputted bit stream relates to the profile of a depth sequence. Then, only when it is verified and approved that the inputted bit stream does in fact relate to the profile of a depth sequence, diverse attribute information may be added. For example, a number of the overall views of the depth sequence, a number of depth-view reference pictures, a view identification number of each depth-view reference picture, and so on, may be added. Furthermore, a decoded picture buffer may use diverse information on depth-view reference pictures in order to create and manage a reference picture list.

FIG. 1 illustrates a drawing shown to describe a depth concept, as an embodiment applied in the present invention.

As described above, depth refers to a difference in variation, which occurs due to a difference in viewpoints (or perspectives) in an image sequence taken (or filmed) by a plurality of cameras. Referring to FIG. 1, a camera position (0c) indicates an origin of 3D camera coordinates system, and a Z-axis (optical axis) should form a straight line with the viewing angle (or direction) of the eyes. Herein, a random point P=(X,Y,Z) of the camera coordinates system may be projected onto a random point p=(x,y) within a 2-dimensional image plane, which is perpendicular to the Z axis. And, the 2D image plane in this case may signify a color picture. Furthermore, p=(x,y) of the 2D image plane may be expressed as value Z of the 3-dimensional coordinates system of P=(X,Y,Z). And, the 2D image plane in this case may signify a depth picture. Herein, a focus length (f) may indicate a distance between a camera position and an image plane. Moreover, although P=(X,Y,Z) of the 3D camera coordinates system represents a random point within the camera coordinates system, when a picture is taken by a plurality of cameras, a common reference coordinates system for the plurality of cameras may be required. In FIG. 1, a random point of the reference coordinates system, which is based upon point 0w, may correspond to Pw=(Xw,Yw,Zw). And, point Pw=(Xw,Yw,Zw) may be converted to a random point P=(X,Y,Z) of the camera coordinates system by using a 3×3 rotation matrix R and a 3×1 translation vector T. Herein, P may be acquired by using Equation 1 shown below.

$$P=R*Pw+T \quad \text{[Equation 1]}$$

When newly defining the term depth picture or depth map based upon the above description, depth picture or depth map may refer to a group of information, which consists of a relative digitalization of the distance between a camera position and the actual object based upon the position of the camera. And, this may also be referred to as a picture unit, a slice unit, and so on. Additionally, the depth information within the depth picture or depth map may be expressed in pixel units.

Each pixel value of the depth picture may be expressed as the Z coordinate value of coordinates P=(X,Y,Z) respective to the camera coordinates system. And, since the Z coordinate value belongs to a range of real numbers, in order to be indicated in a digital image format, the Z coordinate value is required to be quantized to a value belonging to a range of integers. Each pixel value of the depth picture may be quantized by using Equation 2 or Equation 3 shown below.

$$Zq=\text{floor}(255*(Z-Znear)/(Zfar-Znear)+0.5) \quad \text{[Equation 2]}$$

$$Zq=\text{floor}(255*(1/Z-1/Zfar)/(1/Znear-1/Zfar)+0.5) \quad \text{[Equation 3]}$$

As shown in Equation 2 and Equation 3, Zq indicates quantized depth information. Referring to a [Top view] of FIG. 1, Znear represents the lower limit of the Z coordinate value, and Zfar indicates the upper limit of the Z coordinate value. The depth information that is quantized in accordance with Equation 2 and Equation 3 may be given an integer value ranging from 0~255.

As described above, the depth picture or depth map may be coded by using a sequence along with the image sequence of the color picture, or by using a separate sequence. And, in this case, a variety of embodiments may be applied for the compatibility with the conventional codec. For example, a depth coding technique may be applied as a supplemental technique so as to provide compatibility with the H.264 codec, or the depth coding technique may be applied as an extension technique within an H.264/AVC multiview video coding process, or the depth coding technique may be applied as an extension technique within an H.264/AVC scalable video coding process. Furthermore, the depth coding technique may also be used as a separate codec technique for coding only an image sequence including depth pictures. Hereinafter, reference will be made on detailed embodiments for depth coding, and the detailed embodiments of depth coding may be applied to all of the above-described cases.

Figure 2:
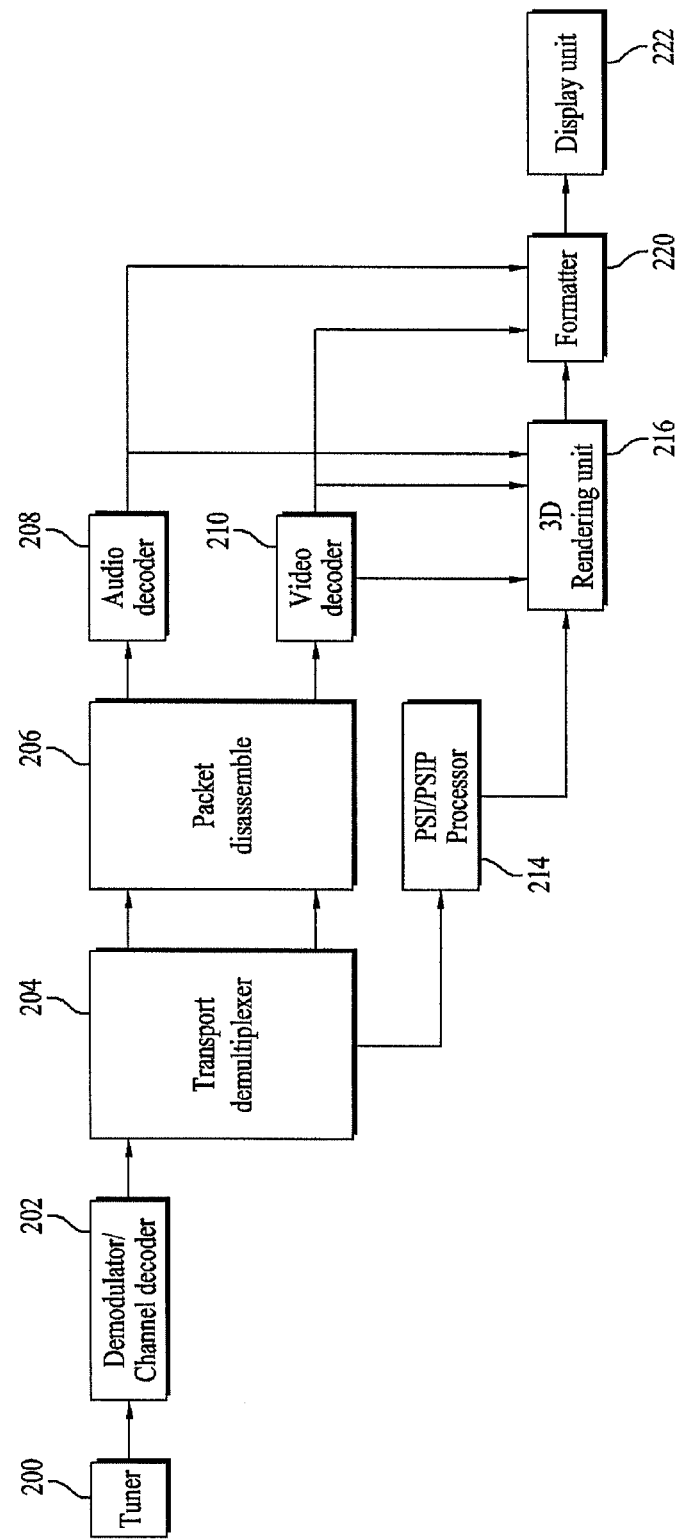
FIG. 2 illustrates an internal block view of a broadcast receiver having depth coding applied thereto, as an embodiment applied in the present invention.

FIG. 2 illustrates an internal block view of a broadcast receiver having depth coding applied thereto, as an embodiment applied in the present invention.

The broadcast receiver according to the embodiment of the present invention receives air wave (or sky wave) broadcast signals so as to playback (or reproduce) images. The broadcast receiver may use the received depth-associated information so as to create 3-dimensional contents. The broadcast receiver includes a tuner (200), a demodulator/channel decoder (202), a transport demultiplexer (204), a packet disassembler (206), an audio decoder (208), a video decoder (210), a PSI/PSIP processor (214), a 3D rendering unit (216), a formatter (220), and a display unit (222).

Among the plurality of broadcast signals being inputted through an antenna (not shown), the tuner (200) selects a broadcast signals of any one channel chosen by the user and outputs the selected signal. The demodulator/channel decoder (202) demodulates the broadcast signal outputted from the tuner (200) and performs error correction decoding on the demodulated signal, so as to output a transport stream (TS). The transport demultiplexer (204) demultiplexes the transport stream, separates (or splits) a video PES and an audio PES, and extracts PSI/PSIP information. The packet disassembler (206) disassembles the packets for the video PES and the audio PES, thereby recovering a video ES and an audio ES. The audio decoder (208) decodes the audio ES and outputs an audio bit stream. The audio bit stream is converted into an analog audio (or voice) signal by a digital to analog converter (not shown). Then, after being amplified by an amplifier (not shown), the amplified signal is outputted through a speaker (not shown). The video decoder (210) decodes the video ES so as to recover the original (or initial) image. The decoding process of the audio decoder (208) and the video decoder (210) may be performed based upon a packet ID (PID), which is verified by the PSI/PSIP processor (214). During the decoding process, the video decoder (210) may extract depth information. Also, the video decoder (210) may extract supplemental information that is required for creating images of a virtual camera view, e.g., camera information, or information for estimating an occlusion, which corresponds to an area that is covered by an obstacle (or object) located in front of the camera (e.g., geometrical information, such as an outline (or silhouette) of the object, information on the transparency of the object, and color information), and so on, thereby providing the extracted information to the 3D rendering unit (216). However, according to another embodiment of the present invention, the depth information and/or supplemental information may be split (or separated) by the transport demultiplexer (204).

The PSI/PSIP processor (214) receives PSI/PSIP information from the transport demultiplexer (204) and parses the received information and stores the parsed information in a memory (not shown) or a register, thereby playing-back (or reproducing) the broadcast program based upon the stored information. The 3D rendering unit (216) uses the recovered image, the depth information, the supplemental information, and the camera parameters, so as to create depth information from a virtual camera position. Also, based upon the recovered image and the depth information from the virtual camera position, the rendering unit (216) performs 3D warping, thereby creating an image from the virtual camera position. According to the embodiment of the present invention, the 3D rendering unit (216) is described as a separate block of the video decoder (210), this is merely exemplary. And, therefore, the 3D rendering unit (216) may also be operated while being included in the video decoder (210).

The formatter (220) formats the image that is recovered during the decoding process. i.e., the image taken by an actual camera, and the image created by the 3D rendering unit (216) to best fit the display method of the corresponding receiver. Thereafter, the formatted 3D images are displayed through the display unit (222). Herein, the synthesis of the depth information and image of the virtual camera position performed by the 3D rendering unit (216) and the image formatting performed by the formatter (220) may be optionally performed in response to a user command. More specifically, the user may manipulate a remote controller (not shown) so that the synthesized image is not displayed, and the user may also use the remote controller to designate a time point at which the image synthesis is to be performed.

As described above, the depth information is used by the 3D rendering unit (216) in order to create a 3D image. However, according to another embodiment of the present invention, the depth information may also be used by the video decoder (210). Hereinafter, various embodiments of the video decoder (210) using the depth information will now be described.

Figure 3:
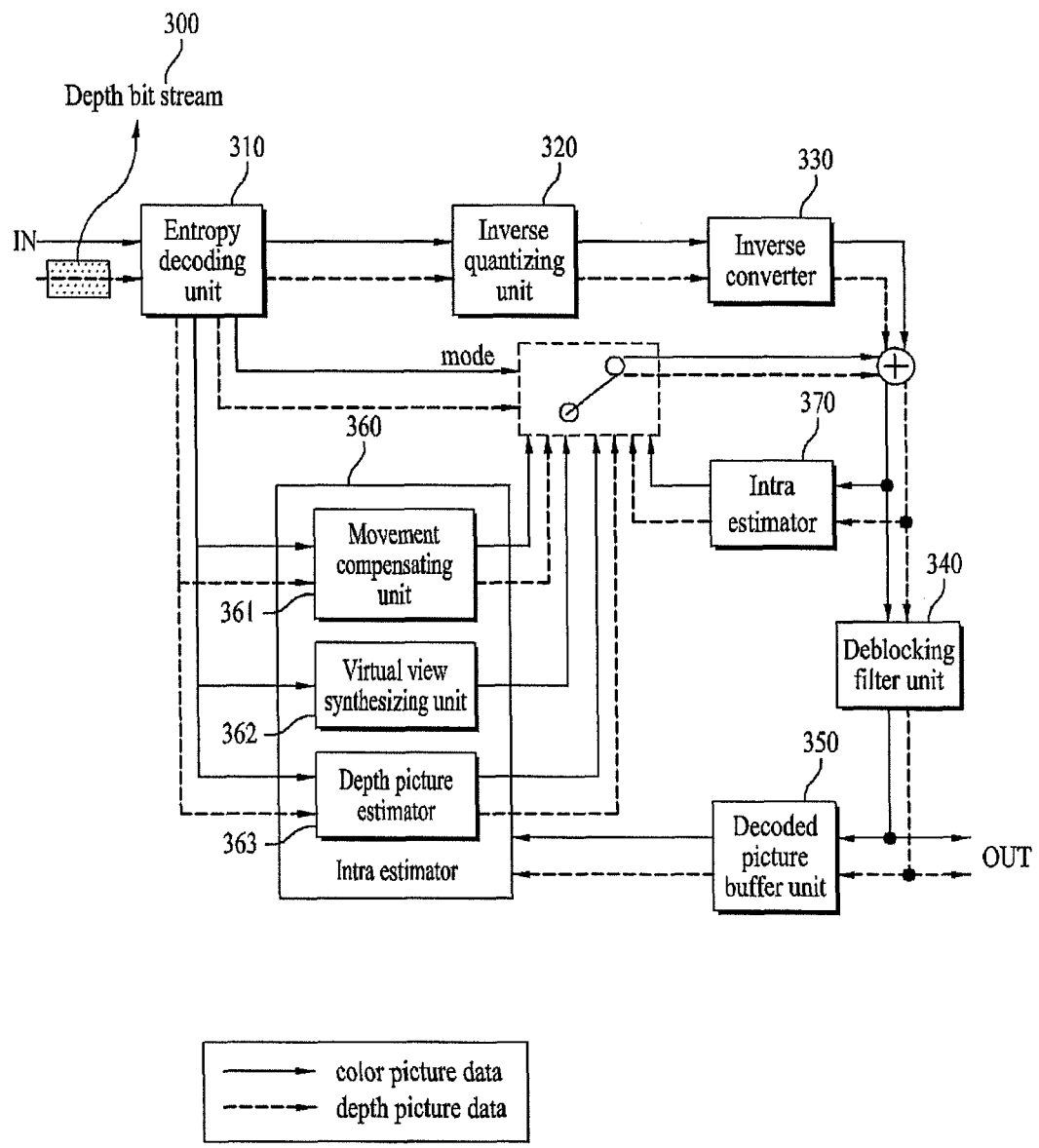
FIG. 3 illustrates an overall block view of a video decoder that can process depth information, as an embodiment applied in the present invention.

FIG. 3 illustrates an overall block view of a video decoder that can process depth information, as an embodiment applied in the present invention.

Referring to FIG. 3, the video decoder (210) may broadly include an entropy decoding unit (310), an inverse quantizing unit (320), an inverse converter (330), a deblocking filter unit (340), a decoded picture buffer unit (350), an inter estimator (360), and an intra estimator (370). Herein, the solid line represents a flow of the color picture data, and the dotted line represents a flow of the depth picture data. As described above, in FIG. 3, the color picture data and the depth picture data are shown to be different from one another. However, this may indicate that each data correspond to a different bit stream or may simply differentiate the flow of each data type within a single bit stream. More specifically, the color picture data and the depth picture data may either be transmitted as a single bit stream or be transmitted as separate bit streams. And, in FIG. 3, only the flow of the data is shown, and the example shown in FIG. 3 does not limit the data flow as being performed only in a single decoder.

First of all, in order to decoder the received depth bit stream (300), parsing is performed in NAL units. Generally, one or more sequence parameter sets and picture parameter sets are transmitted to the decoder before a slice header and slice data are decoded. At this point, various types of depth-associated attribute information may be included in an NAL header area, an extension area of the NAL header, a sequence header area (for example, a sequence parameter set), an extension area of the sequence header, an extension area of a picture header, a slice header area, an extension area of the slice header, or a macro block header.

Depth coding may be used as a separate codec. However, when depth coding is compatible with the convention codec, and only in case of a depth bit stream, it may be more efficient to add diverse attribute information. For example, depth identification information, which can identify whether or not the corresponding bit stream is a depth bit stream, may be added in the sequence header area (e.g., sequence parameter set) or the extension area of the sequence header. Depending upon the depth identification information, attribute information respective to the depth sequence may be added only when the inputted bit stream corresponds to the depth-coded bit stream. For example, the attribute information may include data type identification information, depth-view identification information, and so on. This will be described in more detail with reference to FIG. 4. The parsed depth bit stream (300) is entropy-decoded through the entropy decoding unit (310), and the coefficients of each macro block, movement vectors, and so on are extracted. The inverse quantizing unit (320) multiplies the received quantized value by a constant number, so as to acquire a converted coefficient value. And, the inverse converter (330) performs inverse conversion on the coefficient value, thereby recovering the pixel value. By using the recovered pixel value, the intra estimator (370) may perform an inside-the-screen estimation from a decoded sample within the current depth picture. Meanwhile, the deblocking filtering unit (340) applies deblocking filtering on each of the coded macro blocks in order to reduce block distortion. The filter softens the edge of each block, thereby enhancing the picture quality of a decoded frame. The selection of the filtering process may be decided based upon a boundary strength and a gradient of image samples located near the boundary. The depth pictures that are processed with filtering may either be outputted, or may be stored in the decoded picture buffer unit (350) in order to be used as reference pictures.

In order to perform inter-screen estimation, the Decoded Picture Buffer unit (350) performs the role of either storing the depth pictures that were coded earlier, or exposing (or opening) the coded depth pictures. At this point, in order to perform storage or exposure in the decoded picture buffer unit (350), a frame_num and a POC (Picture Order Count) of each picture are used. Therefore, in performing depth coding, since the current depth picture and depth pictures located in other views among the picture that were coded in an earlier process, in order to use such pictures as the reference pictures, the frame_num and the POC as well as the depth view information, which can identify the viewpoint (or perspective) of a depth picture, may be collectively used.

Also, in order to create a reference picture list for estimating an inter-viewpoint estimation of the depth picture, the decoded picture buffer unit (350) may use the information on the depth view. For example, depth-view reference information may be used. Herein, the depth-view reference information refers to diverse sets of information used for indicating a dependency relation between the views of each depth picture. For example, such depth-view reference information may include a number of the whole depth views, a depth view identification number, a number of depth-view reference picture, a depth view identification number of the depth-view reference picture.

The decoded picture buffer unit (350) manages the reference pictures in order to realize inter-screen estimation more flexibly. For example, a Memory Management Control Operation Method and a Sliding Window Method may be used. This is to integrate the memory of the reference pictures and the memory of the non-reference pictures to a single memory so as to manage a single integrate memory and to perform efficient management by managing a small memory. In performing depth coding, the depth pictures may be marked with a separate indication in order to be differentiated from the color pictures within the decoded picture buffer unit. And, during the marking process, information for identifying each depth picture may be used. The reference pictures that are being managed through such process may be used for depth coding by the inter estimator (360).

Referring to FIG. 3, the inter estimator (360) may include a movement compensator (361), a virtual view synthesizing unit (362), and a depth picture estimator (363).

The movement compensator (361) uses the information transmitted from the entropy decoding unit (310) to compensate for the movements of the current block. Thereafter, movement vectors of neighboring blocks of the current block are extracted from the video signal, and a movement vector estimation value of the current block is acquired. By using the acquired movement estimation value and a difference vector extracted from the video signal, the movement of the current block may be compensated. Additionally, such movement compensation may be performed by using a single reference picture or may be performed by using a plurality of reference pictures. In performing depth coding, when the current depth picture refers to a depth picture of a different view, information on a reference picture list for performing estimation between depth picture views, which is stored in the decoded picture buffer unit (350), may be used to perform the movement compensation. Furthermore, depth view information for identifying the view of the corresponding depth picture may be used to perform the movement compensation.

Also, the Virtual View Synthesizing Unit (362) uses a picture respective to a view neighboring the view of the current picture, so as to synthesize a color picture of a new view. At this point, the color picture of the new view may be used for estimating the current picture. In order to use each of the pictures respective to neighboring views, or in order to use pictures of a specifically requested view, view identification information indicating the view of a picture may be used. When such new view is created, flag information notifying whether or not the new view is to be created is required to be defined. When the flag information notifies that the new view is to be created, the new view may be created by using the view identification information. Pictures respective to the new view acquired from the Virtual View Synthesizing Unit (362) may be used as reference pictures. And, in this case, the view identification information may be allocated to the pictures respective to the new view. Also, during the process of performing movement vector estimation for transmitting the movement vector, neighboring blocks of the current block may refer to the pictures acquired from the Virtual View Synthesizing Unit (362). At this point, in order to use the pictures of the new view as reference pictures, the view identification information, which indicates the view of a corresponding picture, may be used.

According to another embodiment of the present invention, the Virtual View Synthesizing Unit (362) may use a depth picture respective to a view neighboring the view of the current depth picture so as to synthesize a depth picture of a new view. At this point, the depth picture of the synthesized new view may be used for estimating the current depth picture. Also, in order to indicate the depth picture view, depth view identification information may be used. Herein, the depth view identification information may be derived from the view identification information of the respective color picture. For example, the respective color picture may have the same picture output order information and the same view identification information as the current depth picture.

According to yet another embodiment of the present invention, the Virtual View Synthesizing Unit (362) may use a depth picture respective to a view neighboring the view of the current depth picture so as to synthesize a color picture of a new view. Alternatively, the Virtual View Synthesizing Unit (362) may use a color picture respective to a view neighboring the view of the current color picture so as to synthesize a depth picture of a new view.

The depth picture estimator (363) may use depth coding information so as to estimate the current depth picture. Herein, the depth coding information may refer to information related to depth coding, e.g., new macro block type information for depth coding, boundary identification information within a depth picture, information indicating whether or not data within an RBSP include depth-coded data, or information indicating whether or not a data type corresponds to depth picture data, color picture data, or parallax data.

The pictures inter-estimated and picture intra-estimated by using the above-described process are selected in accordance with the estimation mode, so as to recover the current picture (or the current depth picture).

Figure 4:
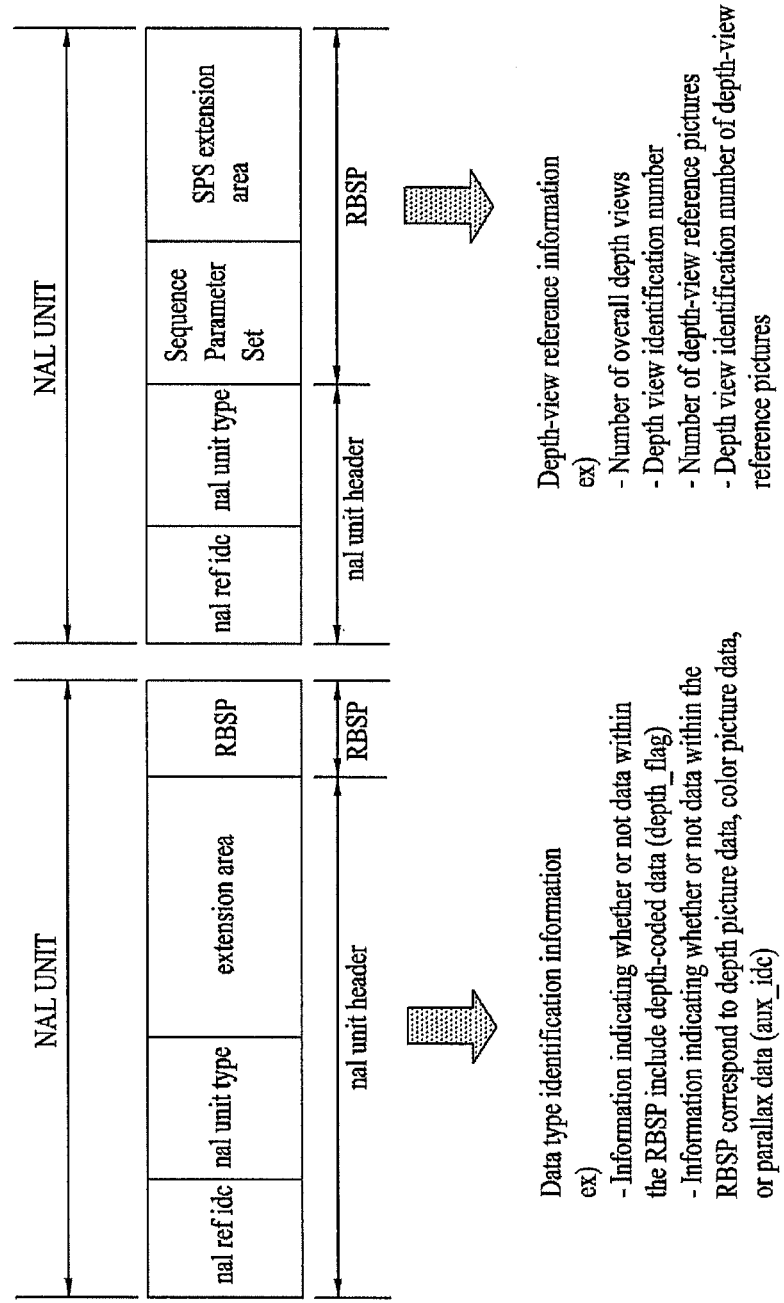
FIG. 4 illustrates a depth coding information that can be included in a depth-coded bit stream, as an embodiment applied in the present invention.

FIG. 4 illustrates a depth coding information that can be included in a depth-coded bit stream, as an embodiment applied in the present invention.

FIG. 4 shows an exemplary NAL unit configuration that may include attribute information of a depth-coded bit stream. The NAL unit is broadly configured of a NAL unit header and an RBSP (Raw Byte Sequence Payload (result data of moving image compression)). Herein, the NAL unit header may include identification information (nal_ref_idc) indicating whether or not the NAL unit includes a slice of a reference picture and information (nal_unit_type) indicating the type of the NAL unit. Also, with limitations, the NAL unit header may also include an extension area of the NAL unit header. For example, when the information indicating the NAL unit type is associated with scalable video coding, or when the information indicating the NAL unit type is associated with multiview video coding, or when the information indicating the NAL unit type is associated with depth coding, or when the information indicating the NAL unit type indicates a prefix NAL unit, the NAL unit may also include an extension area of the NAL unit header. More specifically, for example, when the nal_unit type indicates extension data of a slice layer, or when the nal_unit type indicates extension data of a sequence header, or when the nal_unit_type indicates extension data of a subset sequence header, or when the nal_unit_type indicates a prefix NAL unit, the NAL unit may also include an extension area of the NAL unit header. Furthermore, in the extension area of the NAL unit header, depending upon the flag information that can identify whether or not the bit stream corresponds to a depth-coded bit stream, attribute information respective to the depth sequence may be added.

In another example, when the information indicating the NAL unit type corresponds to information indicating a sequence header, the RBSP may include information of a sequence parameter set. At this point, depending upon the profile information, the sequence parameter set may include an extension area of the sequence parameter set. For example, wen the profile information (profile_idc) corresponds to a profile associated with depth coding, the sequence parameter set may include an extension area of the sequence parameter set. Alternatively, depending upon the profile information, the subset sequence parameter set may include an extension area of the sequence parameter set. The extension area of the sequence parameter set may include depth-view reference information indicating a dependency between views of a depth picture.

Hereinafter, diverse attribute information respective to a depth sequence, for example, attribute information that may be included in an extension area of a NAL unit header, or attribute information that may be included in an extension area of a sequence parameter set will now be described in detail.

First of all, data type identification information may represent information that can identify the type of the data included in an RBSP of a NAL unit. For example, information (depth_flag) indicating whether or not data within the RBSP include depth-coded data may be defined. Alternatively, information (aux_idc) indicating whether or not data within the RBSP correspond to depth picture data, color picture data, or parallax data may also be defined herein. The information may be defined in an extension area of the NAL header unit.

Also, depth-view reference information may represent information indicating the dependency between views of a depth picture. More specifically, this information refers to information indicating the structure based upon which the depth pictures are estimated. Such information may be acquired from a data region of a video signal, e.g., from a sequence parameter set area or an extension area of a sequence parameter set area. Moreover, the depth-view reference information may be identified by using the number of reference picture and the view information on the reference pictures. For example, the overall number of views of the depth pictures is first acquired. Then, based upon the overall number of views, depth view identification information identifying the view of each depth picture may be identified. Then, information on the number of depth-view reference pictures, which indicates a number of reference pictures respective to a reference direction for each view, may be acquired. Depending upon the information on the number of depth-view reference pictures, view identification information of each depth-view reference picture may be acquired.

The depth-view reference information may be acquired by using the above-described method. And, the depth-view reference information may be identified in accordance to two different cases, one corresponding to an interview picture group and the other corresponding to a non-interview picture group. This may be known by using interview picture group identification information, which indicates whether or not a coded slice included in the current NAL corresponds to an interview picture group. Such interview picture group identification information may be acquired from an extension area of the NAL header. Furthermore, depth-view reference information that is acquired in accordance with the interview picture group identification information may be used for creating and managing a reference picture list.

Figure 5:
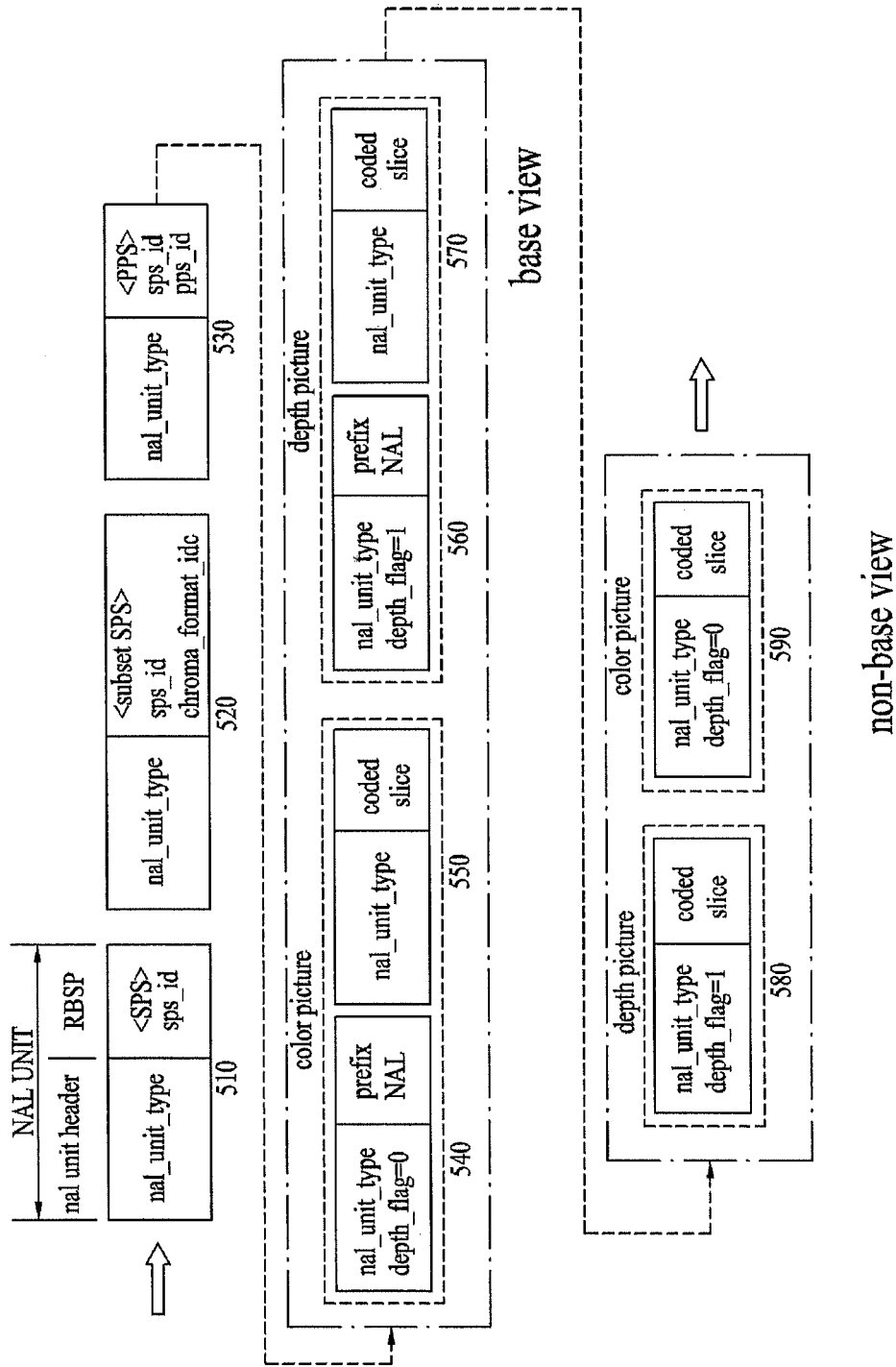
FIG. 5 illustrates a structure of a depth-coded bit stream and a method for transmitting the same, as an embodiment applied in the present invention.

FIG. 5 illustrates a structure of a depth-coded bit stream and a method for transmitting the same, as an embodiment applied in the present invention.

Since a whole compressed moving image, i.e., sequence must start from a sequence header, a sequence parameter set equivalent to header information should reach the decoder earlier than data that refer to the sequence parameter set. Similarly, a picture parameter set equivalent to header information of a picture should also reach the decoder earlier than data that refer to the picture parameter set. For example, a sequence identification number (sps_id) (510 or 520) for identifying each sequence parameter set exists in a sequence parameter set, and a picture identification number (pps_id) (530) for identifying each picture parameter set and a sequence identification number (sps_id) (530) indicating which sequence parameter set is to be referred to both exist in a picture parameter set. Similarly, a picture identification number (pps_id) indicating which picture parameter set is to be referred to exists in a slice.

After the picture parameter set, slice data may be transmitted afterwards. At this point, in case of an image sequence acquired from a plurality of cameras, data respective to a base view may be transmitted earlier than data respective to a non base view. This is because the data respective to the base view is used as a reference view of the data respective to the non base view. Herein, a base view refers to a view that can be coded by a generic image coding method (MPEG-2, MPEG-4, H.263, H.264, H.264/AVC, etc.), thereby being configured as an independent bit stream. This may also refer to a view that can be independently coded without using information of another view. Alternatively, this may refer to a view that can be compatible to a generic image coding method. On the other hand, a non base view refers to a view that does not correspond to a base view. This may also refer to a view that cannot be independently coded, i.e., a view that can be coded by using information of another view.

When a random picture within the base view or the non base view is transmitted, color picture data and depth picture data may be divided into separate NAL units, thereby being transmitted. At this point, in case of the base view, color picture data (540, 550) may be transmitted earlier than the depth picture data (560, 570). And, in case of the non base view, the depth picture data (580) may be transmitted earlier than the color picture data (590).

Herein, the NAL units including the color picture data and the depth picture data may each include depth flag information (depth_flag), which indicates whether or not data within the RBSP of a NAL unit include depth-coded data, in each NAL header area. For example, when depth_flag is equal to 0, this indicates that the data within the RBSP do not include the depth-coded data, i.e., the data within the RBSP include color picture data. And, when depth_flag is equal to 1, this indicates that the data within the RBSP include the depth-coded data. However, in case the NAL unit type corresponds to a prefix NAL, no information is included in the RBSP of the corresponding NAL unit (540, 550), and coded slice data are included in the RBSP of a NAL unit immediately following the prefix NAL (550, 570).

According to another embodiment applying the present invention, a current access unit and a previous access unit may be identified by the depth flag information (depth_flag). For example, depth flag information of a first NAL unit of the current access unit is different from the depth flag information of a last NAL unit of the previous access unit. Also, view information of a first NAL unit of the current access unit is smaller than the view information of a last NAL unit of the previous access unit. Herein, view information may refer to view identification information of a NAL unit, or view information may refer to a variant derived from view identification information of the NAL unit. Herein, the variant derived from view identification information of the NAL unit may correspond to information indicating a decoding order between views. Also, herein, the NAL unit may signify a NAL unit of a picture that is not a repeatedly coded picture. More specifically, the NAL unit may refer to a NAL unit of a primary coded picture.

FIG. 6 and FIG. 7 illustrate diverse exemplary information for identifying depth information, as embodiments applied in the present invention.

Information for identifying a depth sequence may be included in an extension area of a NAL unit header, or in an extension area of a sequence parameter set. Data type identification information may be given as an example of information for identifying the depth sequence.

The data type identification information may refer to information for identifying a type of the data included in the RBSP of an NAL unit. For example, as shown in FIG. 6, depth flag information (depth_flag) indicating whether or not the data within the RBSP include depth-coded data may be defined (S620). At this point, the depth flag information (depth_flag) may be included in an extension area of the NAL header unit, and the extension area may refer to an extension area of a multiview video coded NAL unit header (S610). Alternatively, the extension area may refer to an extension area of a scalable video coded NAL unit header or may refer to an extension area of a depth coded NAL unit header.

As another example of the data type identification information, as shown in FIG. 7, mode identification information (aux_idc) indicating whether or not the data within the RBSP correspond to depth picture data, color picture data, or parallax picture data (S720). The mode identification information (aux_idc) may be included in an extension area of a multiview video coded NAL unit header (S710). Accordingly, when the mode identification information (aux_idc) is included in the extension area of a multiview video coded NAL unit header, 1 byte is additionally required. At this point, as shown in the above-described example, if the mode identification information (aux_idc) defines only 3 different cases, 2 bits are required. Therefore, the remaining 6 bits may be reserved as trailing bit for the possibility of additional extension in a later process (S730). In this case, the NAL unit header may have an overall size of 4 bytes. Also, the mode identification information (aux_idc) may also be included in the extension area of a scalable video coded NAL unit header or may be included in the extension area of a depth coded NAL unit header, as described in the embodiment of the depth flag information (depth_flag).

FIG. 8 and FIG. 9 illustrate diverse examples of identifying depth information, as embodiments applied in the present invention.

In order to process a depth sequence, it is required to be identified whether or not an inputted bit stream corresponds to a profile of a depth sequence. And, when the inputted bit stream is determined as the profile of a depth sequence, a syntax is required to be added, so that at least one set of additional information associated with depth coding can be transmitted. For example, referring to FIG. 8, when a profile identifier (profile_idc) indicates that the inputted bit stream corresponds to a multiview video coded sequence or to a depth-coded sequence (S820), data belonging to an extension area of a multiview video coded sequence parameter set may be extracted (S830). Herein, the data belonging to the extension area of a multiview video coded sequence parameter set may refer to reference information between views that can indicate the structure to which the images between views have been estimated. The reference information between views may include number information of the entire view, view information identifying each view, number information of reference pictures respective to the reference direction for each view, and view information of the reference pictures. Also, the reference information between views may be identified by a case corresponding to an interview picture group and a case corresponding to a non-interview picture group.

Furthermore, when the profile identifier (profile_idc) indicates that the inputted bit stream corresponds to a multiview video coded sequence or to a depth-coded sequence (S820), and when an extension parameter used for multiview video coding exists (S840), in case the profile identifier (profile_idc) indicates that the inputted bit stream corresponds to a depth-coded sequence (S850), data of the extension area of a depth-coded sequence parameter set may be extracted (S860). The data of the extension area of the depth-coded sequence parameter set will be described in detail later on with reference to FIG. 10 to FIG. 12.

Furthermore, referring to FIG. 8, data associated with depth coding (e.g., data belonging to an extension area of a depth-coded sequence parameter set) may be acquired along with the multiview video coded data. More specifically, a depth-coded bit stream is compatible with a multiview video coded bit stream. And, in case the depth-coded data do not exist, only the multiview video coded data can be acquired.

Meanwhile, referring to FIG. 9, a multiview video coded bit stream and an independently depth-coded bit stream may be extracted. More specifically, in case the profile identifier indicates that the corresponding bit stream is a multiview video coded sequence (S920), data belonging to an extension area of a multiview video coded sequence parameter set may be extracted (S930). And, in case the profile identifier indicates that the corresponding bit stream is a depth-coded sequence (S940), data belonging to an extension area of a depth-coded sequence parameter set may be extracted (S950). Hereinafter, data of the extension area of the depth-coded sequence parameter set will now be described in detail with reference to FIG. 10 to FIG. 12.

FIG. 10 and FIG. 12 illustrate detailed information of data belonging to an expansion area of a depth-coded sequence parameter set, as embodiments applied in the present invention.

First of all, referring to FIG. 10, depth-view reference information and depth auxiliary information may be given as examples of the data belonging to extension areas (S1010, S1110) of the depth-coded sequence parameter set. Herein, the depth-view reference information may refer to information indicating a dependency between the views of depth pictures, as described in FIG. 4.

Herein, the depth-view reference information may have the same value as reference information between views in the multiview video coding process described in FIG. 8. Alternatively, the depth-view reference information may be derived from the reference information between views in the multiview video coding process.

Since the depth-view reference information is highly likely to have the same value as the reference information between views, it may be inefficient to transmit the reference information between views along with the depth-view reference information. Therefore, the coding efficiency may be enhanced by using skip information (skip_depth_dependency) indicating whether or not the depth-view reference information is coded (S1030), or by using flag information (same_dependency_flag) indicating whether or not the depth-view reference information is identical to the reference information between views. For example, when the skip_depth_dependency is equal to 1, this indicates that the depth-view reference information is identical to the reference information between views. And, when the depth-view reference information is derived from the reference information between views, and when the skip_depth_dependency is equal to 0, the depth-view reference information is extracted.

The depth-view reference information may be determined (or identified) by using a number of reference pictures and view information of the reference pictures. For example, a number of the overall views of depth pictures may first be acquired (S1020). Then, the skip information (skip_depth_dependency) may be acquired (S1030), and in case it is indicated that the depth-view reference information is coded in accordance with the skip information, or in case the depth-view reference information is not identical to the reference information between views, depth-view reference information (A) may be acquired. As a detailed example of the depth-view reference information (A), depth view identification information identifying the view of each depth picture may first be determined (or identified) based upon the number of overall views (S1040). Thereafter, information on the number of depth-view pictures indicating the number of reference pictures respective to the reference direction for each view maybe acquired (S1051, S1053, S1061, S1063). Based upon the information on the number of depth-view pictures, view identification information of each depth view reference picture may be acquired (S1052, S1054, S1062, S1064).

According to another embodiment of the present invention, referring to FIG. 11, unlike the description made with reference to FIG. 10, reference information between views of multiview video coding (C) is included. As shown in FIG. 11, the depth-view reference information may be acquired along with the reference information between views of multiview video coding (C). More specifically, skip information is acquired (S1130). Then, depending upon the skip information, if the depth-view information is not identical to the reference information between views, depth-view reference information (A) may be acquired (S1170). Details on the reference information between views of multiview video coding (C) (S1140, S1151~S1154, S1161~S1164) has already been described with reference to FIG. 8. Meanwhile, FIG. 12 illustrates a detailed example of depth auxiliary information. Herein, depth auxiliary information refers to auxiliary information for depth coding, and camera parameter information may be given as the most typical example of the depth auxiliary information (S1210).

The camera parameter information may correspond to an intrinsic camera parameter (S1211) and an extrinsic camera parameter. Herein, the intrinsic camera parameter may consist of a focal length (S1212), a principal point (S1213), a skew (S1214), and an aspect ratio. The extrinsic camera parameter may consist of position information of the camera within a standard coordinates system. Herein, it is assumed that the extrinsic camera parameter is calibrated so that all cameras can have the same value. And, one intrinsic camera parameter that is commonly applied to all cameras may be delivered to the receiving system. Alternatively, an intrinsic camera parameter may be individually delivered to the receiving system for each camera.

The focal length may be expressed by differentiating a horizontal focal length (focal_length_x) from a vertical focal length (focal_length_y). Similarly, a position of the principal point may also be expressed by differentiating a horizontal principal point (principal_point_x) from a vertical principal point (principal_point_y). Additionally, each parameter is expressed in a floating point format, according to the standards IEC 60559:1989 to IEEE 954-1985, wherein symbols, exponents, and significant decimal places are differentiated. According to an embodiment of the present invention, the symbol may be expressed as a 1-bit integer, and the exponents and significant decimal places may each be expressed as a 6-bit integer. Most particularly, in order to indicate negative numbers, the exponents may be expressed in a biased exponent format of an excess-31 code.

Meanwhile, extrinsic camera parameters, each being separately defined for all cameras including actual cameras and virtual cameras, may include a rotation parameter and a translation parameter as shown below. The rotation parameter (prec_rotation_param) indicates an exponent of a maximum tolerated rounddown error of a rotation matrix element r[i][j][k]. Herein, the maximum tolerated rounddown error is equal to $2^{-prec\_rotation}$ (S1221). The translation parameter (prec_translation_param) indicates an exponent of a maximum tolerated rounddown error of a translation matrix element t[i][j][k]. Herein, the maximum tolerated rounddown error is equal to $2^{-prec\_translation}$ (S1222).

Also, the camera parameter information may include Z coordinates information of a depth picture, scale information, and offset information. The Z coordinates information of the depth picture may be used for recovering the Z coordinates value described in FIG. 1. As information being used when scaling the depth picture, the scale information may include a horizontal element (scale_x) (S1251) and a vertical element (scale_y) (S1252). The scale information may be used for changing the resolution of a depth picture, which is received at a resolution lower than an original (or initial) resolution, to its original resolution.

The offset information may include offset information of a horizontal direction (offset_x) (S1261) and offset information of a vertical direction (offset_y) (S1263) between a 1/16 sampling position within a color picture and a position of the depth picture. Also, in performing a estimation coding process between the depth pictures, the offset information may include up, down, left, and right cropping information (top_offset, bottom_offset, left_offset, right_offset) (S1264, S1266, S1263, S1265), which are generated due to a difference in spatial resolution when performing up-sampling (or down-sampling) on the depth picture. When the estimation coding process is performed between the depth pictures, the up, down, left, and right cropping information may be used to perform a more accurate estimation.

As described above, a video decoder having the present invention applied thereto is equipped to a multimedia broadcast receiving/transmitting device, such as DMB (Digital Multimedia Broadcasting), and may be used to decode video signals and data signals. Furthermore, the multimedia broadcast receiving/transmitting device may include a mobile communication terminal.

Additionally, a decoding/coding method having the present invention applied thereto may be produced as a program for executing the methods in a computer. Herein, the produced program may be stored in a recording medium that can be read by the computer. Furthermore, multimedia data having the data structure according to the present invention may also be stored in a recording medium that can be read by the computer. The recording medium that can be read by the computer includes all types of storage devices storing data that can be read by a computer system. Examples of the recording medium, may include ROM, RAM, CR-ROM, magnetic tapes, floppy disks, optical data storage devices, and so on. Also, the recording medium may also be realized in the form of a carrier wave (e.g., transmission through the internet). Finally, a bit stream that is generated by the coding method may be stored in the recording medium that can be read by the computer, or may be transmitted by using a wireless/wired communication network.

INDUSTRIAL APPLICABILITY

As described above, the preferred embodiments of the present invention id disclosed for the objects presented herein. Therefore, anyone skilled in the art may be capable of modifying, changing, replacing, or supplementing a variety of other embodiments of the present invention, without departing from the technical scope and spirit of the present invention.

DRAWINGS

FIG. 1
FIG. 2
200: Tuner
202: Demodulator/Channel decoder
204: Transport demultiplexer
206: Packet disassemble
208: Audio decoder
210: Video decoder
214: PSI/PSIP Processor
216: 3D Rendering unit
220: Formatter
222: Display unit
FIG. 3
300: Depth bit stream
310: Entropy decoding unit
320: Inverse quantizing unit
330: Inverse converter
340: Deblocking filter unit
350: Decoded picture buffer unit
360: Inter estimator
361: Movement compensating unit
362: Virtual view synthesizing unit
363: Depth picture estimator
370: Intra estimator
FIG. 4
Information indicating whether or not data within the RBSP include depth-coded data (depth_flag)
Information indicating whether or not data within the RBSP correspond to depth picture data, color picture data, or parallax data (aux_idc)
Number of overall depth views
Depth view identification number
Number of depth-view reference pictures
Depth view identification number of depth-view reference pictures
FIG. 5
FIG. 6
FIG. 7
FIG. 8
FIG. 9
FIG. 10
FIG. 11
FIG. 12

What is claimed is:

1. A method for processing a video signal, the method comprising:
   receiving a multi-view video coded bit stream including color pictures and depth pictures, wherein the depth picture indicates a group of digitalized information on a distance between a base camera and an object;
   acquiring data type identification information from the multi-view video coded bit stream, wherein the data type identification information indicates whether or not depth-coded data are included in the multi-view video coded bit stream;
   acquiring reference information between views of the depth picture based upon the data type identification information, wherein the reference information between views of the depth picture includes a number of depth-view reference pictures, and a view identification number of the depth-view reference picture;
   acquiring an estimation value of the depth picture by using the reference information between views of the depth picture;
   recovering the depth picture by using the estimation value of the depth picture; and
   acquiring a 3-dimensional image by using the recovered depth picture,
   wherein the multi-view video coded bit stream includes a base view and a non-base view of both color pictures and depth pictures, wherein the base view indicates a view that can be decoded independently from other views without using a prediction between views, and wherein the non-base view indicates a view other than the base view, and
   wherein, in case of the base view, the color picture is transmitted earlier than the depth picture, and wherein, in case of the non-base view, the depth picture is transmitted earlier than the color picture.

2. A device for processing a video signal, the device comprising:
   a video decoding apparatus configured to:
      acquire data type identification information from a multi-view video coded bit stream including a base view and a non-base view, each of the base view and the non-base view including a color picture and a depth picture, wherein the base view indicates a view that is decoded independently from other views without using inter-view prediction, the non-base view indicates a view other than the base view, and the depth picture indicates a group of digitalized information on a distance between a base camera and an object, and wherein the data type identification information indicates whether or not depth-coded data are included in the multi-view video coded bit stream;
      acquire depth-view reference information of the depth picture based upon the data type identification information;
      acquire an estimation value of the depth picture by using the depth-view reference information, wherein the depth-view reference information includes number information of depth-view reference pictures and view identification information of each depth-view reference picture; and
      recover the depth picture by using the estimation value of the depth picture,
      wherein, in case of the base view, the color picture is transmitted earlier than the depth picture, and wherein, in case of the non-base view, the depth picture is transmitted earlier than the color picture, and wherein acquiring the depth-view reference information comprises:

acquiring flag information indicating whether the depth-view reference information is identical to inter-view reference information of the color picture, the inter-view reference information including number information of reference pictures and view identification information of each reference picture; and deriving the depth-view reference information from the inter-view reference information based on the flag information indicating that the depth-view reference information is identical to the inter-view reference information.

3. The device of claim 2, wherein the entropy decoding unit receives identification mode information for identifying whether or not the multi-view video coded bit stream includes a depth-coded bit stream, and wherein, if the multi-view video coded bit stream is determined to include the depth-coded bit stream based upon the identification mode information, the depth-view reference information is acquired.

4. The device of claim 3, wherein the identification mode information is acquired from a sequence header area.

5. The device of claim 3, wherein the data type identification information is acquired from an extension area of a depth-coded Network Abstraction Layer (NAL) unit.

6. The method of claim 1, further comprising:

receiving identification mode information for identifying whether or not the multi-view video coded bit stream includes a depth-coded bit stream, wherein, if the multi-view video coded bit stream is determined to include the depth-coded bit stream based upon the identification mode information, the depth-view reference information is acquired.

7. The method of claim 6, wherein the identification mode information is acquired from a sequence header area.

8. The method of claim 1, wherein the data type identification information is acquired from an extension area of a depth-coded Network Abstraction Layer (NAL) unit.

* * * * *